US006833974B2

(12) United States Patent
Koso et al.

(10) Patent No.: US 6,833,974 B2
(45) Date of Patent: Dec. 21, 2004

(54) HEAD POSITIONING DEVICE AND DISK DRIVE USING SAME

(75) Inventors: Hiroshi Koso, Osaka (JP); Hideki Kuwajima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 257 days.

(21) Appl. No.: 10/288,631

(22) Filed: Nov. 5, 2002

(65) Prior Publication Data

US 2003/0112547 A1 Jun. 19, 2003

(30) Foreign Application Priority Data

Nov. 5, 2001 (JP) ........................................ 2001-339107

(51) Int. Cl.[7] .............................................. G11B 5/596
(52) U.S. Cl. ..................................................... 360/78.05
(58) Field of Search .......................... 360/78.05, 77.02; 369/43, 47.1

(56) References Cited

U.S. PATENT DOCUMENTS 6,724,563 B2 * 4/2004 Kobayashi et al. ...... 360/78.05

FOREIGN PATENT DOCUMENTS

| JP | 60-035383 | 2/1985 |
| JP | 61-121471 | 6/1986 |
| JP | 04-330679 | 11/1992 |
| JP | 06-096545 | 4/1994 |
| JP | 10-255418 | 9/1998 |
| JP | 11-354852 | 12/1999 |

OTHER PUBLICATIONS

Takigami et al., "Tracking Control of a Cantilever Beam Using Self–Sensing Actuator Based on Virtual Bridge Circuit", Transactions of the Japan Society of Mechanical Engineers, vol. 64, No. 624, pp. 2931–2937 (1998) (with English Abstract).

* cited by examiner

Primary Examiner—Andrew L. Sniezek
Assistant Examiner—Mitchell Slavitt
(74) Attorney, Agent, or Firm—RatnerPrestia (57) ABSTRACT

Vibration detector receives as an input a relative displacement signal corresponding to a displacement distance of fine actuator, and extracts only a high frequency component. Fine actuator is driven according to a composite signal generated in fine motion corrector by combining the high frequency component with fine motion control signal produced on the basis of position error signal. In addition, coarse actuator is driven according to a composite signal generated in coarse motion corrector by combining the high frequency component with coarse motion control signal produced on the basis of the relative displacement signal. According to the above configuration, a head positioning device employing a two-stage actuator is able to perform positioning control with stable operation even when it receives external disturbances such as vibrations and impacts.

15 Claims, 6 Drawing Sheets

HEAD POSITIONING DEVICE AND DISK DRIVE USING SAME

FIELD OF THE INVENTION

The present invention relates to a head positioning device having an actuator of two-stage structure, and a disk drive using the same.

BACKGROUND OF THE INVENTION

With the evolution of multimedia in recent years, there are strong demands in the market for such disk drives having high recording density with a capability of positioning a head promptly into a target position on a recording medium of discoidal shape, to read and/or write a large volume of image data, sound data, text data and the like at high speed. There are also proposed a variety of techniques for positioning a head at high speed with high accuracy. As the techniques of achieving the high-speed and high-accuracy positioning, some of them draw attention as they employ a method of controlling two drive mechanisms, a main drive mechanism and a subsidiary drive mechanism, in such a manner as to function cooperatively to position the head.

The main drive mechanism is used primarily for a large motion of the head such as a seek operation and jumping across a plurality of tracks, and it rotates a head support mechanism by using a voice coil motor (hereinafter referred to as "VCM") or the like around a shaft mounted to a chassis to move the head and head slider. The subsidiary drive mechanism is used mainly for a high-speed minute positioning of the head such that it follows a track, jumps over a single track and the like, and it is controlled over a wide band, but within a small movable range, by a piezo-electric component such as a piezo element, disposed to a tip end of the main drive mechanism to position the head and the head slider with a quick response. A drive mechanism provided with the main drive mechanism and the subsidiary drive mechanism is generally called two-stage actuator or piggyback actuator. The main drive mechanism and the subsidiary drive mechanism are called coarse actuator and fine actuator respectively. The control method using a two-stage actuator for positioning of the head as described above is proposed as one of the high-speed and high-accuracy positioning techniques (Japanese Patent Laid-open Publication, No. H10-255418, for example).

A piezo element used as the fine actuator, in particular, has functions of both a piezoelectric effect and a reverse-piezoelectric effect. That is, the piezo element has a capability of positioning control by using a minute displacement due to a strain produced as the reverse-piezoelectric effect by a control voltage, while it also capable of detecting a minute distance of displacement using a voltage generated with the piezoelectric effect by the displacement. Another technique of controlling an actuator called self-sensing actuator is thus proposed, using both of the above functions (refer to Transactions of the Japan Society of Mechanical Engineers, Vol. 64, No. 624, pages 2931–2937, published August 1998, under the title of "Tracking control of a cantilever beam using self-sensing actuator based on virtual bridge circuit"). In addition, a control technique of the two-stage actuator is also proposed as the technique that applies the above actuator control technique to a disk drive, in which a piezo element defining the fine actuator is mounted to a head support mechanism driven by a coarse actuator, thereby making it capable of controlling high-speed and high-accuracy positioning by using both functions of the piezo-electric effect and the reverse-piezoelectric effect of the piezo element (Japanese Patent Laid-open Publication, No. S60-35383, for example).

Furthermore, there is also proposed another technique of controlling the two-stage actuator, in which a fine actuator using a piezo element is made to function as a sensor for detecting vibrations and/or impacts applied to a disk drive for the purpose of correcting a displacement of a head position due to the vibrations and/or the impacts (e. g., Japanese Patent Laid-open Publication, No. H04-330679).

Figure 5:
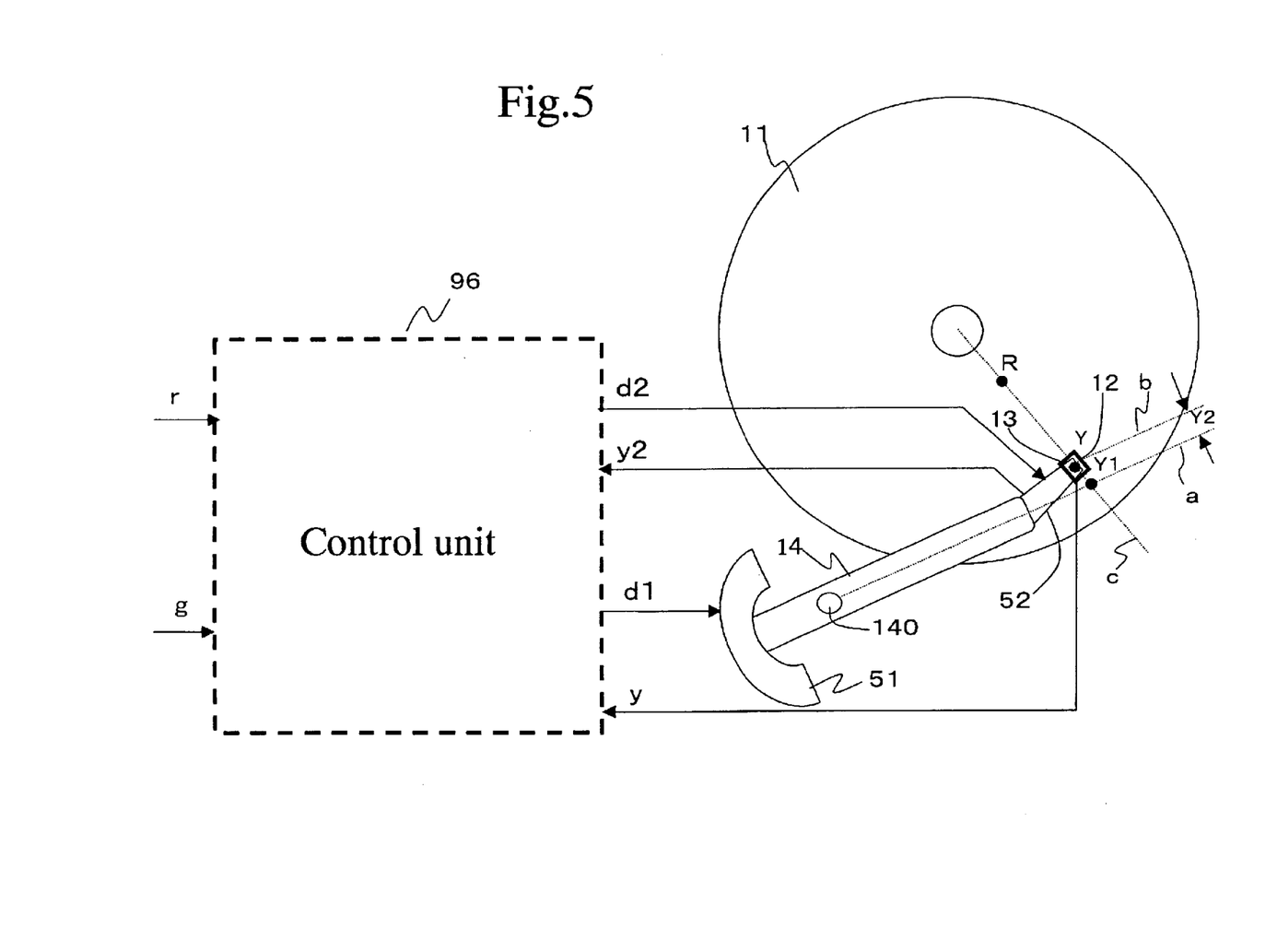
FIG. 5 is a structural diagram of a head positioning device of the prior art.

FIG. 5 depicts a structural diagram of a head positioning device provided with a two-stage actuator and is capable of making correction of any displacement of a head position due to vibrations and the like by using its fine actuator to function as a vibration sensor. Referring now to FIG. 5, the head positioning device will be described hereafter as an example of the prior art.

In FIG. 5, magnetic head 12 (hereinafter referred to as "head"), which reads and writes data to and from magnetic disk 11 (hereinafter referred to as "disk"), i.e. a kind of recording media of a discoidal shape, is mounted integrally to a tip of head slider 13. The head slider 13 is mounted to a tip end of fine actuator 52, and the fine actuator 52 is connected to one end of head support mechanism 14. The head support mechanism 14 is driven by coarse actuator 51 to rotate about rotary shaft 140 mounted to a main body of the disk drive, and to position the head 12 in cooperation with function of the fine actuator 52. Furthermore, the coarse actuator 51 moves the head support mechanism 14 including the head 12 to a target position "R" in response to coarse motion drive signal "d1" from control unit 96. The fine actuator 52 is controlled by fine motion drive signal "d2" of the control unit 96 in a manner that the head 12 mounted to the tip end of the head support mechanism 14 is displaced, or shifts, slightly by distance "Y2" from center position "Y1" located along a line extending from the head support mechanism 14. The head 12 reads present position signal "y" indicating position "Y", where the head 12 is located presently, from a servo data recorded beforehand on the disk 11. At the same time, the displacement distance "Y2" of the fine actuator 52 from the center position "Y1" to the head position "Y" can be detected using a piezo element or the like. In this instance, the piezo element detects the actual distance "Y2" of a minute displacement of the fine actuator 52 to produce relative displacement signal "y2". The control unit 96 receives the present position signal "y", the relative displacement signal "y2" and target position signal "r" directed to it for a movement toward the target position "R", performs respective computations, and produces coarse motion drive signal "d1" and fine motion drive signal "d2". The head 12 is positioned into the target position "R" according to these drive signals obtained as a result the computations. The structure discussed above thus accomplishes positioning control to the target track.

In this example of the prior art, the control unit 96 additionally receives gate signal "g" for vibration detection. The control unit 96 detects external vibrations in response to a command given by the gate signal "g" for vibration detection, and corrects any deviation in position of the head due to the vibrations and the like.

Figure 6:
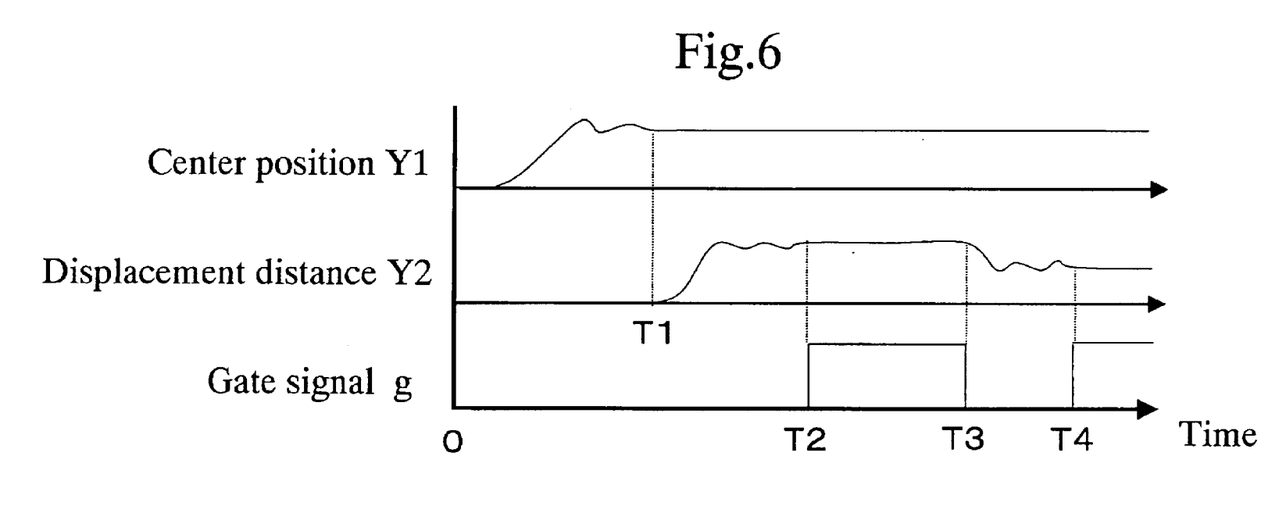
FIG. 6 is an operational timing chart illustrating an operation of the head positioning device of the prior art.

FIG. 6 depicts an operational timing chart illustrating an operation for correcting an influence of external vibrations in the example of the prior art. As shown in FIG. 6, this head positioning device of the prior art uses coarse actuator 51 to carry out rough positioning from time 0 to time T1. It further carries out the positioning from time T1 to time T2 in a manner to locate the head 12 into a target track by displacing the fine actuator 52 to such an extent as shown by the displacement distance "Y2". It then holds the fine actuator 52 to maintain the displacement distance constant for duration between time T2 and time T3, or a gate period, and detects vibration data from the fine actuator 52 in response to the gate signal "g" for vibration detection. In other words, the control unit 96 keeps the displacement distance "Y2" of the fine actuator 52 unchanged when the head 12 reaches the target position "R". During this period, the fine actuator 52 itself functions as a sensor, and the control unit 96 uses relative displacement signal "y2" as the vibration data. In addition, the control unit 96 feeds back the vibration data into control signals of the fine actuator 52 and the coarse actuator 51 to drive them in a manner to cancel any deviation caused by the vibrations.

Accordingly, the above example of the prior art can also make correction of deviation in position of the head due to vibrations. Furthermore, it can be constructed at low cost since it uses the fine actuator 52, which is inherently provided for the purpose of head positioning, as means for detecting vibrations, without having any additional element such as an acceleration sensor specifically for the vibration detection.

However, the above example of the prior art has a problem that it can not perform correction against vibrations occurring during a seek operation, for instance, because it is unable to detect vibrations during any other time than the period directed by the gate signal "g" for vibration detection.

That is, the above example has the capability of detecting external impacts and vibrations and making correction of a deviation in position of the head during an operation following the moment when the head reaches near the target position, or the period between time T2 and time T3 as shown in FIG. 6. However, the fine actuator 52 cannot be used as a sensor for detecting the vibrations and impacts while the head 12 is in motion such as in the period from time 0 to time T2. Therefore, it tends to fail proper correction of a deviation of the head position, if it receives external impacts and/or vibrations during such period, and thereby it is likely to take a longer time to complete the positioning.

As described above, the prior art example is liable to increase the time it requires for the positioning, since the head 12 tends to shift substantially from the prescribed position if there are external impacts and/or vibrations while the head 12 is in motion.

SUMMARY OF THE INVENTION

The present invention is devised to solve the foregoing problems, and intended to provide a head positioning device capable of performing positioning control with stable operation at all times even when it receives external vibrations and impacts. This is achieved by adding a simple element to a positioning control system having a two-stage actuator. The invention also provides a disk drive using the same head positioning device.

To accomplish the above object, the head positioning device of this invention comprises an actuator, or head moving means provided with a coarse actuator and a fine actuator, and control means for controlling the actuators to function cooperatively to move and position the head to a target position in a manner that an absolute value of displacement distance of the fine actuator is reduced to a minimum. Furthermore, the control means has a structure that comprises positioning control means for generating a control signal to control positioning of the coarse actuator and the fine actuator, vibration detection means for extracting only a high frequency component contained in a signal corresponding to a magnitude of the displacement distance of the fine actuator, and disturbance correction means for combining the high frequency component with the control signal.

According to the above structure, the vibration detection means extracts only the high frequency component contained in the signal corresponding to the displacement distance of the fine actuator, as a vibrating component caused by the external disturbances. The disturbance correction means corrects an influence of the external disturbances using the extracted vibrating component. As a result, the head positioning device can use the inherently provided fine actuator to detect the external disturbances without needing any provision of additional acceleration sensor and the like. Besides, the vibration detection means separates and extracts the vibrating component produced by the external disturbances according to its frequency, from a regulating component required for the positioning control, as contained in the signal corresponding to the displacement distance of the fine actuator. The head positioning device of the present invention can therefore detect the vibrating component due to external disturbances without being restricted by time such as a time period during which the fine actuator is held at the prescribed distance of displacement. According to the present invention, the head positioning device can thus correct an adverse effect of the external disturbances to the positioning control at any time when it is operating, so as to reduce degradation of a positioning accuracy resulting from the disturbances during the operation.

Moreover, the head positioning device of the present invention comprises a fine actuator for making fine positioning of a head mounted to it for reading and/or writing data on a discoidal recording medium, a coarse actuator for making rough positioning of the head by moving a head support mechanism equipped with the fine actuator, and a control unit for controlling a displacement, or a shift, of the fine actuator as well as a movement of the head by the coarse actuator. Furthermore, the control unit comprises a fine motion controller, a coarse motion controller, a vibration detector, a fine motion corrector, and a coarse motion corrector. The fine motion controller receives a difference between a target position signal for positioning the head into a target position and a present position signal derived from a servo data on the recording medium read by the head, as an input of position error signal, and generates a fine motion control signal to control a magnitude of displacement of the fine actuator according to the position error signal. The coarse motion controller receives a relative displacement signal corresponding to the displacement distance of the fine actuator, and generates a coarse motion control signal to control a movement of the head by the coarse actuator based on this relative displacement signal. The vibration detector receives the relative displacement signal, extracts a high frequency component contained in the relative displacement signal, and uses the extracted high frequency component as a vibration detection signal to produce and output a fine motion correction signal and a coarse motion correction signal by amplifying the vibration detection signal with predetermined amplification factors. The fine motion corrector produces a signal by combining together the fine motion control signal and the fine motion correction signal, and outputs it as a fine motion composite signal. The coarse motion corrector produces another signal by combining together the coarse motion control signal and the coarse motion correction signal, and outputs it as a coarse motion composite signal. In this structure, the fine actuator is driven according to the fine motion composite signal, and the coarse actuator is driven according to the coarse motion composite signal.

According to this structure, a vibration detector extracts only a vibrating component attributable to the external disturbances as contained in the relative displacement signal from the fine actuator. A disturbance corrector performs correction of the influence resulting from the external disturbances by using the extracted vibrating component. As a result, it is not specially required to have an acceleration sensor or the like, but it can use the inherently provided fine actuator. In addition, the vibration detector separates and extracts the vibrating component produced by the external disturbances according to its frequency, from the regulating component for the positioning control, as contained in the relative displacement signal. Therefore, the head positioning device of the present invention can detect the vibrating component from the external disturbances without being restricted by time such as a time period during which the fine actuator is held at a prescribed distance of the displacement. According to the present invention, the head positioning device can thus correct an adverse effect of the external disturbances to the positioning control at any time when it is operating, so as to reduce degradation of a positioning accuracy resulting from the disturbances during the operation.

Furthermore, the head positioning device of the present invention has the fine actuator comprised of a piezo-electric element.

This structure enables the head positioning device to detect the relative displacement signal corresponding to the displacement distance of the fine actuator by using a piezo-electric effect of the piezo-electric element, and to control the displacement of the fine actuator at the same time by way of driving the fine actuator according to the fine motion composite signal using a reverse-piezoelectric effect.

Moreover, the head positioning device of the present invention has the vibration detector comprising a band-pass filter for extracting a signal component of high frequencies within a predetermined bandwidth, wherein the vibration detector outputs the signal component extracted by the band-pass filter as a vibration detection signal.

With this structure, the head positioning device can easily extract at all times the vibrating component resulting from the external disturbances contained in the relative displacement signal derived from the fine actuator. As a result, the head positioning device is not specially required to have an acceleration sensor or the like, but it can use the relative displacement signal from the inherently provided fine actuator to detect the vibrating component from the external disturbances without being restricted by time. In addition, the device can also use the detected vibration detection signal to reduce degradation of a positioning accuracy resulting from the disturbances during its operation.

Further, the head positioning device of the present invention has the vibration detector, which comprises a coring circuit having a nonlinear characteristic for removing a signal component of minute amplitude. The coring circuit has such a structure that receives a signal component of high frequency extracted by the band-pass filter, and outputs, as a vibration detection signal, a signal processed nonlinearly by use of the nonlinear characteristic.

This structure enables the head positioning device to separate the vibrating component produced by the external disturbances from the regulating component for positioning control, as contained in the relative displacement signal, and to detect the vibrating component more accurately. As a result, the device can effectively reduce degradation of the positioning accuracy resulting from the disturbances during its operation by using the detected vibration detection signal.

A disk drive of the present invention has a structure comprising the head positioning device described above.

The disk drive of this structure is not specially required to have an acceleration sensor or the like, but it can use the inherently provided fine actuator to detect external disturbances. In addition, the disk drive of this invention can detect the vibrating component due to the external disturbances without being restricted by time. According to the present invention, the disk drive can therefore correct an adverse effect of the external disturbances to the positioning control at any time when it is operating, so as to reduce degradation of a positioning accuracy resulting from the disturbances during the operation.

DETAILED DESCRIPTION OF THE INVENTION

Taking a magnetic disk drive unit as an example, the preferred embodiment of a head positioning device according to the present invention will be described hereinafter with reference to the accompanying drawings.

(First Exemplary Embodiment)

Figure 1:
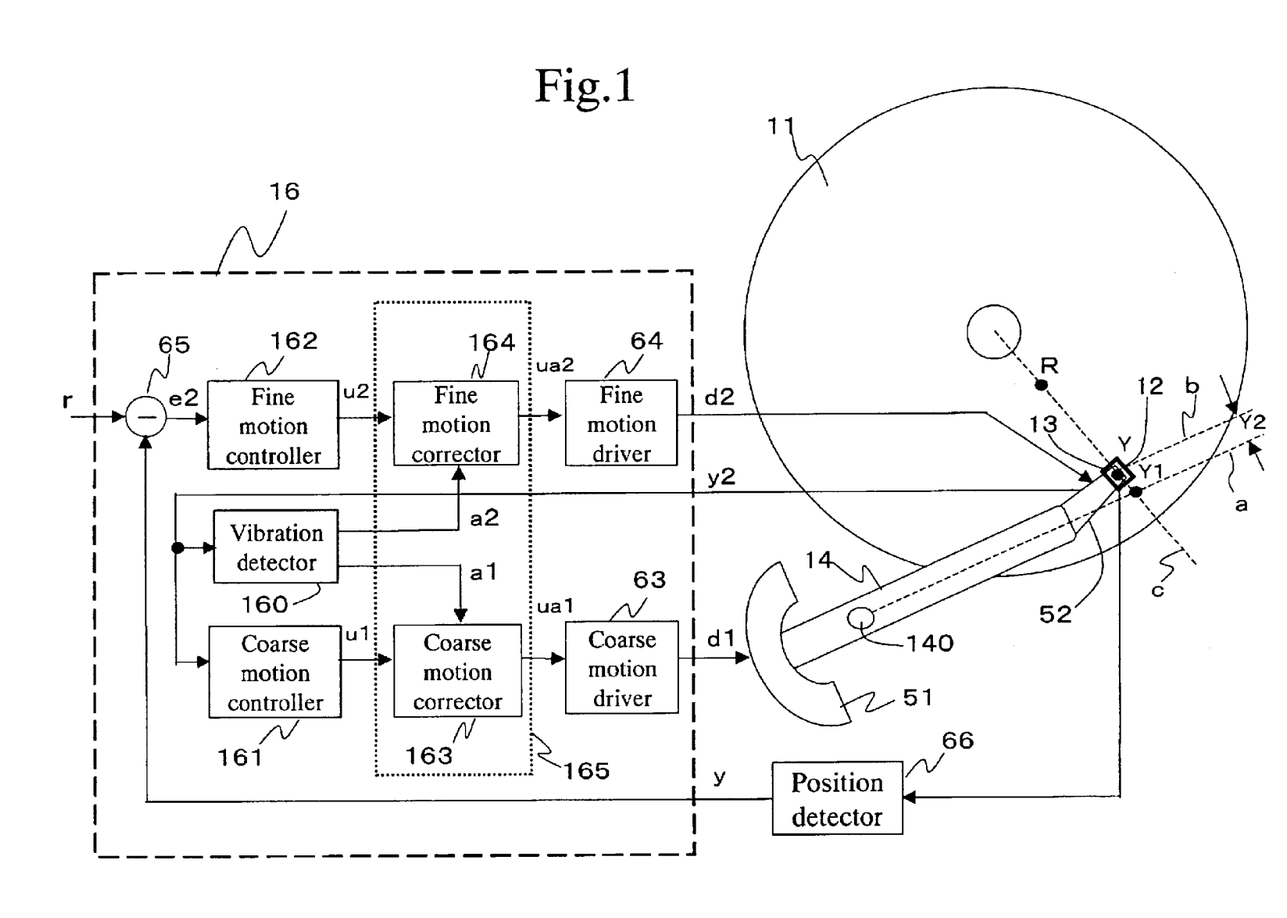
FIG. 1 is a structural diagram of a head positioning device of a first exemplary embodiment of the present invention.

FIG. 1 is a structural diagram of a head positioning device, representing the first exemplary embodiment of the present invention.

In FIG. 1, magnetic head 12 (hereinafter referred to as "head"), which reads and writes data to and from magnetic disk 11 (hereinafter referred to as "disk"), a kind of recording media of a discoidal shape, is mounted integrally to a tip of head slider 13. The head slider 13 is mounted to a tip end of fine actuator 52, and the fine actuator 52 is connected to one end of head support mechanism 14. The head support mechanism 14 is driven by coarse actuator 51 to rotate about rotary shaft 140 mounted to a main body of the disk drive, and to position the head 12 in cooperation with function of the fine actuator 52. As illustrated, a positioning mechanism of this head positioning device has a structure of two-stage actuator having the coarse actuator 51 and the fine actuator 52. The coarse actuator 51 rotatively drives the head support mechanism 14 with a voice-coil motor or the like to move the head 12 on its tip end, and that the coarse actuator 51 is used primarily for a large movement such as a seek operation, jumping across a plurality of tracks, and the like. On the other hand, the fine actuator 52 is controlled over a wide band, but within a small movable range, by a piezo-electric component or an electrostrictive component such as a piezo element, to move the head 12 on the tip end with a quick response, and it is used mainly for a fine positioning of the head 12 at high speed, such as following a track, jumping over a single track, and the like. For the piezo-electric component, it is possible to utilize a piezo-electric film. And also, it is possible to provide a suspension to part of the head support mechanism 14, and mount this piezo-electric film on that suspension. With this construction, small sized fine actuator 52 is realized.

In addition, the positioning mechanism of this head positioning device is driven to carry out the positioning in response to a control signal from control unit 16 designated as control means. The control unit 16 generates the control signal according to a signal corresponding to a magnitude of displacement, i.e. a displacement distance, of the fine actuator 52, present position signal "y" generated by position detector 66, target position signal "r" directed to it for an operation of the necessary positioning, and so forth. The position detector 66 reads a servo data recorded on the disk 11 with the head 12, and generates the present position signal "y" which represents a present position of the head 12.

In the control unit 16, subtracter 65 generates position error signal "e2" indicating a positional error from the target position by subtracting the present position signal "y" from the target position signal "r". Fine motion controller 162 receives the position error signal "e2", processes it through a filter of a predetermined transfer characteristic, and amplifies it to generate fine motion control signal "u2". The fine motion controller 162 generates the fine motion control signal "u2" to control positioning of the fine actuator 52. Fine motion corrector 164 combines the fine motion control signal "u2" with fine motion correction signal "a2" from vibration detector 160, which will be described later, and outputs the combined signal as fine motion composite signal "ua2". Fine motion driver 64 converts the fine motion composite signal "ua2" into fine motion drive signal "d2", which is a corresponding signal suitable for driving the fine actuator 52, and delivers it to drive the fine actuator 52. Furthermore, this head positioning device is capable of detecting a displacement distance of the fine actuator 52. The control unit 16 receives relative displacement signal "y2" which is a signal corresponding to the detected displacement distance of the fine actuator 52. Coarse motion controller 161 receives the relative displacement signal "y2", processes it through a filter of a predetermined transfer characteristic, and amplifies it to generate coarse motion control signal "u1" to control positioning of the coarse actuator 51. The coarse motion corrector 163 combines the coarse motion control signal "u1" with coarse motion correction signal "a1" from the vibration detector 160, as will be described later, and outputs the combined signal as coarse motion composite signal "ua1". Coarse motion driver 63 converts the coarse motion composite signal "ua1" into coarse motion drive signal "d1" a corresponding signal suitable for driving the coarse actuator 51, and delivers it to drive the coarse actuator 51. The fine motion corrector 164 and the coarse motion corrector 163 constitute disturbance corrector 165.

In the control unit 16, the vibration detector 160 receives the relative displacement signal "y2" from the fine actuator 52, extracts high frequency components as vibrating components generated due to vibrations and/or impacts impressed from the outside, and produces fine motion correction signal "a2" and coarse motion correction signal "a1" according to the vibrating components for use to reduce an influence of the vibrations and/or impacts. The control unit 16 combines the fine motion correction signal "a2" with the fine motion control signal "u2" for driving the fine actuator 52, and the coarse motion correction signal "a1" with the coarse motion control signal "u1" for driving the coarse actuator 51. With the structure as described, the control unit 16 drives the coarse actuator 51 and the fine actuator 52 to make good use of the both actuators in accomplishing positioning of the head 12. That is, in the control unit 16, the vibration detector 160 functions as vibration detection means for extracting only the high frequency components contained in the signal corresponding to the displacement distance of the fine actuator 52, and the disturbance corrector 165 functions as disturbance correction means for correcting a deviation in position of the head due to external disturbances such as vibrations and/or impacts, by combining the high frequency components extracted by the vibration detector 160 with the control signal.

As shown in FIG. 1, the fine actuator 52 makes fine positioning of the head 12 by displacing, or shifting it in the direction of an inner side or the direction of an outer periphery of the disk 11 from center position "Y1" located along a line shown with broken line "a" extending from the head support mechanism 14. In the drawing here, a distance of the displacement from the center position "Y1" to the position of the head 12 is shown as displacement distance "Y2". In this head positioning device, head position "Y" of the head 12 defines a combination between a position determined by the coarse actuator 51, or the center position "Y1", and the displacement distance "Y2" of the fine actuator 52, and the head 12 is positioned by moving it to target position "R" so as to make the head 12 follow a target track in the target position "R".

Figure 2:
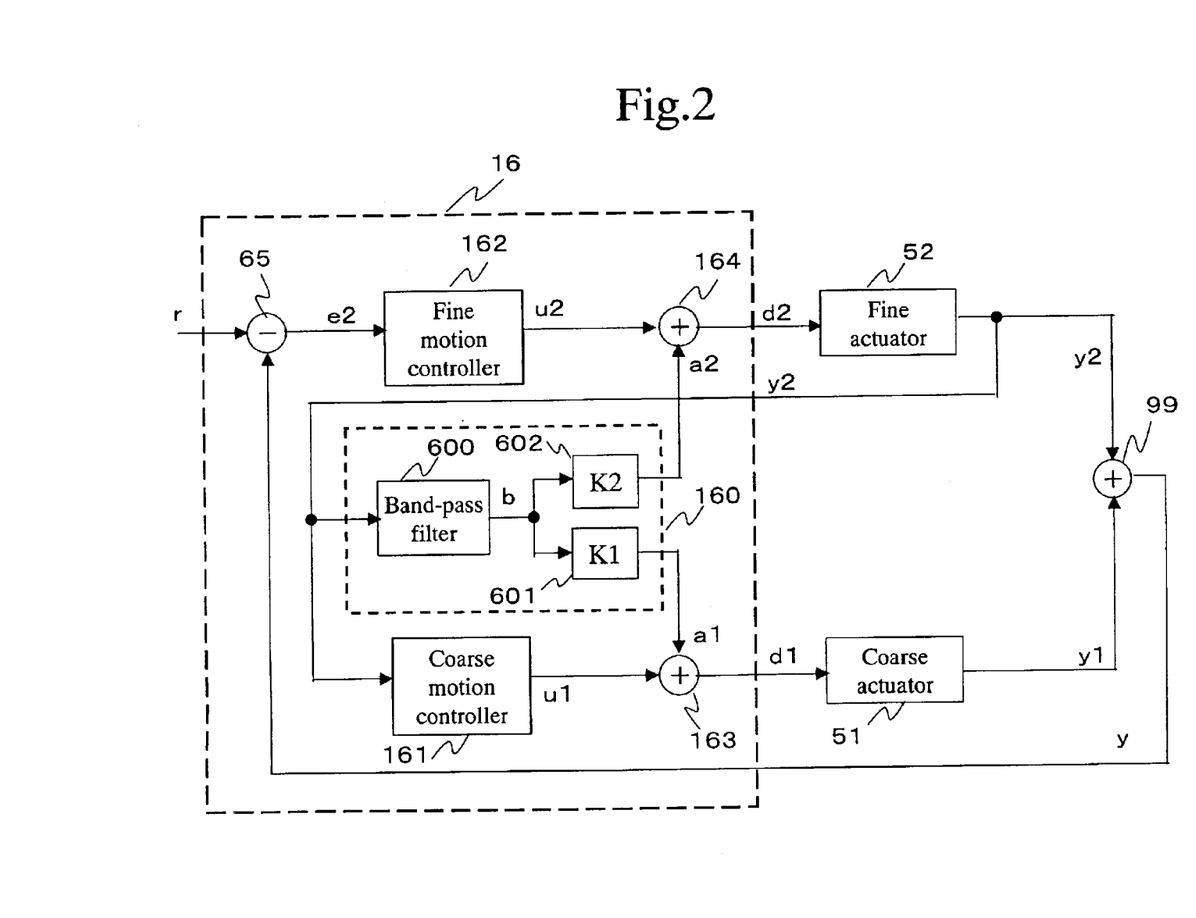
FIG. 2 is a block diagram of the head positioning device of the first exemplary embodiment of the invention.

FIG. 2 is a block diagram of the positioning control system that controls a two-stage actuator according to the present exemplary embodiment illustrated in FIG. 1.

An operation of the head positioning device for positioning control will now be described hereinafter with reference to a model block diagram representing a positioning control system of this device.

In FIG. 2, present position signal "y" is shown as a model signal, which is produced in adder 99 by adding virtual signal "y1" representing position "Y1" of the head 12 delivered by the coarse actuator 51 and the relative displacement signal "y2" corresponding to the displacement distance "Y2" detected by the fine actuator 52. Subtracter 65 subtracts the present position signal "y" from target position signal "r" corresponding to the target position "R" as directed for movement to the target track. The difference derived by this subtraction is output as position error signal "e2" indicating a positional error. The position error signal "e2" is input to the fine motion controller 162, which controls the fine actuator 52 for positioning using this position error signal "e2" in the normal operation. On the other hand, displacement distance "Y2" of the head position shifted by the fine actuator 52 can be detected by using the piezo element. In this exemplary embodiment, the displacement distance "Y2" of the fine actuator 52 is detected as relative displacement signal "y2". The relative displacement signal "y2" is input to the coarse motion controller 161, and movement of the head 12 by the coarse actuator 51 is normally controlled according to this relative displacement signal "y2". The structure as described above thus carries out the positioning control, in which the head 12 is positioned by a cooperative function of the coarse actuator 51 and the fine actuator 52 to conform with two operation modes, i.e. a seek operation mode for moving the head across tracks toward a target track and a following operation mode for making the head follow along the center of the target track.

In addition, this head positioning device is provided with vibration detector 160 for detecting vibrations and impacts, and disturbance corrector 165 for reducing an influence of the vibrations and impacts, in order to repress any adverse effect of the vibrations and the impacts, even if received during the positioning operation. The disturbance corrector 165 comprises coarse motion corrector 163 and fine motion corrector 164. The vibration detector 160 comprises band-pass filter 600, amplifier 601 and another amplifier 602. The band-pass filter 600 receives the relative displacement signal "y2" from the fine actuator 52, extracts signal components of high frequencies within a predetermined bandwidth contained in the relative displacement signal "y2", and outputs the extracted signal components as vibration detection signal "b". The amplifiers 601 and 602 having their respective gains of predetermined values amplify the vibration detection signal "b". The amplifier 602 outputs fine motion correction signal "a2" to the fine motion corrector 164, and the amplifier 601 outputs coarse motion correction signal "a1" to the coarse motion corrector 163. The vibration detector 160 having the above structure thus detects a deviation in position of the head 12 due to external disturbances such as the vibrations and the impacts that affect positioning control of the head 12. In addition, the vibration detector 160 generates signals for the correction according to the detected signal. The present head positioning device uses the generated signals, i.e. the coarse motion correction signal "a1" and the fine motion correction signal "a2", to repress the influence resulting from the vibrations and the impacts.

As illustrated, the head positioning device of this exemplary embodiment is characterized by having the vibration detector 160 for extracting vibrating components contained in the external disturbances from the relative displacement signal "y2" of the fine actuator 52, and the disturbance corrector 165 for repressing influence of the vibrations and the impacts based on the extracted vibrating components.

Accordingly, the head positioning device of this exemplary embodiment makes the disk drive capable of repressing any influence of vibrations and impacts at all the time when it receives the vibrations and the impacts, thereby achieving reliable control for the positioning. The head positioning device operates in a manner, which is described hereinafter.

Described first pertains to a normal positioning operation when the head positioning device receives no disturbance such as vibrations and/or impacts. When a target track is directed, there is a difference between present position signal "y" representing the present position and target position signal "r". This difference is input to the fine motion controller 162 as position error signal "e2". Since the fine motion controller 162 has a fast response speed, it first displaces or shifts the fine actuator 52 in the direction of the target track. A displacement distance of the fine actuator 52 is detected as relative displacement signal "y2", and the coarse motion controller 161 receives this relative displacement signal "y2". As a result, the coarse actuator 51 starts moving the head support mechanism 14 in the direction of the target track, to initiate a seek operation. While the fine actuator 52 is kept displaced in the direction of the target, and the coarse actuator 51 controlled with the relative displacement signal "y2" corresponding to a magnitude of the displacement distance, the head 12 moves toward the target track at approximately a regular speed. As the head 12 comes close to the target track, the displacement distance of the fine actuator 52 decreases since a level of the position error signal "e2" decreases, and therefore the head 12 approaches the target track while slowing down its speed. Generally, the head 12 reaches the target track once with the fine actuator 52 kept displaced, although this depends on certain specified conditions. Afterwards, a position of the head 12 vibrates about the target track by functions of the fine actuator 52 and the coarse actuator 51 in such a manner that the displacement of the fine actuator 52 is reduced to zero. After the above transient period, the head 12 begins a following operation to trace the target track with the fine actuator 52 eventually in a state of virtually zero displacement.

In short, the present head positioning device comprises the two-stage actuator having the coarse actuator 51 and the fine actuator 52, and control means for controlling the two-stage actuator, and that the control means defining control unit 16 operates the two-stage actuator cooperatively to move the head 12 to the target position and to carry out positioning control in a manner that an absolute value of the displacement distance of the fine actuator 52 is reduced to a minimum, or zero.

As described, the head positioning device controls the fine actuator 52 according to the position error signal "e2", and the coarse actuator 51 according to the relative displacement signal "y2" from the fine actuator 52. Accordingly, this head positioning device makes the fine actuator 52 and the coarse actuator 51 function cooperatively to move the head 12 across tracks and to perform a track following operation. In addition, the head positioning device performs positioning control of the head 12 in a manner that an absolute value of the displacement distance of the fine actuator 52 is reduced to zero, after the head 12 reaches the target track during a seek operation and the like. Therefore, this head positioning device is able to perform the following operation such as the track following operation with the fine actuator 52 in the most stable state, in which the displacement is kept near zero.

When consideration is given to frequency components of the relative displacement signal "y2" in the foregoing case of positioning operation, in which the head positioning device is not affected by external disturbances, it can be said that these frequency components are distributed in a range near direct current. That is, the signal "y2" is close to a direct current in view of its frequency, since the head positioning device functions with the fine actuator 52 kept displaced by a given distance in the direction of the target position during a seek operation, and with the fine actuator 52 displaced only slightly, if any, during a following operation. In other words, this head positioning device does not make vibrational operation in which the fine actuator 52 repeats positive to negative displacement, except for a transition period from the seek operation to the following operation. If, on the contrary, the head positioning device employs such a head positioning method that the fine actuator is displaced at random toward the target position from zero displacement, for instance, operation of the device includes repeated displacements between the positive and the negative directions, and therefore the relative displacement signal has widely distributed frequency components including high frequency components.

As described, the frequency components of the relative displacement signal "y2" are distributed in the vicinity of direct current under the normal condition when the head positioning device does not receive external disturbance. In other words, the relative displacement signal "y2" of this instance has the signal components for positioning control only, as they are distributed in the vicinity of direct current in respect of their frequencies. Therefore, these signal components for positioning control contained in the relative displacement signal "y2" do not pass through the band-pass filter 600. As a result, in the ordinary cases, the head positioning device operates in the similar manner as the case in which the device is not provided with the disturbance corrector 165. In short, this head positioning device performs the ordinary head positioning operation as described above.

However, if the head positioning device receives external disturbances such as vibrations and impacts, the fine actuator 52 and the head support mechanism 14 vibrate in response to the disturbances. Such disturbances include eccentrical vibrations of a shaft of the spindle motor, mechanical resonance of the positioning mechanism generated within the disk drive unit, vibrations and impacts from the outside of the disk drive unit, and the like. Frequency components of these disturbances are distributed in the vicinity of certain frequency bands peculiar to their origins. Since these frequency components give vibrations to the positioning control system, the vibrations exert influence upon the positioning accuracy. This head positioning device uses the fine actuator 52 as a sensor for detecting such vibrating components, thereby realizing it capable of reducing degradation of the positioning accuracy due to the vibrations by using thus detected signal.

Described next pertains to an operation when such external disturbances are given. When the disk drive receives vibrations and/or impacts for instance, the head 12 is forcibly removed from a prescribed position controlled by the positioning control system. The head positioning device operates in a manner to pull back the head 12 again to the target position by repressing the influence. If the vibrations and/or the impacts are too large, however, they overcome the pullback operation of the head positioning device, and the forcible vibrations due to the vibrations and/or the impacts continue. The fine actuator 52 is also forced to repeat unintended displacement responsive to the vibrations. Therefore, when there are external disturbances, the relative displacement signal "y2" carries additional signal components due to vibrations caused by the disturbances (hereinafter referred to as "vibrating component"), which is superimposed over the original signal components for positioning control (hereinafter referred to as "regulating component").

Because the vibrating components represent a vibrating signal, they are composed of relatively high frequency components. Therefore, if there are external disturbances, the band-pass filter 600 outputs the relatively high frequency components, i.e. a signal derived from extraction of only the vibrating components. In other words, the band-pass filter 600 has the function of extracting the vibrating components of the disturbances. As already described in the above case of normal operation, regulating components of the relative displacement signal "y2" are distributed in the vicinity of direct current in respect to their frequencies, regardless of the positioning operation such as seek operation and following operation.

Therefore, according to the present invention, the vibrating components of the external disturbances are separable from the regulating component with the band-pass filter 600. In other words, this invention makes the head positioning device capable of detecting the vibrating signal components of the disturbances at all the time regardless of any mode of the positioning operation, since it uses the band-pass filter 600 to separate the vibrating signal components of the disturbances from the regulating signal components for positioning control according to their frequencies.

Vibration detection signal "b" consisting of thus separated and extracted vibrating components is amplified to a predetermined gain and output as fine motion correction signal "a2" to the fine motion corrector 164 composed of an adder, and also as coarse motion correction signal "a1" to the coarse motion corrector 163 composed of another adder. The fine motion corrector 164 further adds the fine motion correction signal "a2", which is for canceling the forcible vibrations of the external vibrations and impacts, to the fine motion control signal "u2" for positioning control. As a result, the fine motion drive signal "d2" drives the fine actuator 52 in a manner to repress the vibrations due to the external vibrations and impacts. On the other hand, the coarse motion corrector 163 adds the coarse motion correction signal "a1", also for canceling the forcible vibrations due to external vibrations and impacts, to the coarse motion control signal "u1" for positioning control. Thus, the coarse motion drive signal "d1" drives the coarse actuator 51 in a manner to repress the vibrations due to the external vibrations and impacts. Although not illustrated in the drawings, the control unit 16 is so designed as to properly make phase correction in a way that the disturbance corrector 165 cancel the vibrating components, as needless to note.

The head positioning device operates in the foregoing manner to repress the degradation of positioning accuracy resulting from the disturbances at all the time without being restricted only to a certain time period such as in the following operation, during which the fine actuator is held to the given distance of displacement. In short, the head positioning device employs the band-pass filter 600 to extract the vibrating components contained in the relative displacement signal "y2", and uses them as the vibration detection signal "b" representing vibrations of the fine actuator 52 caused by the external disturbances. Therefore, the head positioning device can detect the vibrations due to the external disturbances at all the time during the operation. In addition, the head positioning device can repress the degradation of positioning accuracy resulting from the disturbances by correcting influence of the disturbances with the vibration detection signal "b", thereby achieving the stable operation at all the time in the positioning control of the head 12.

Figure 3A:
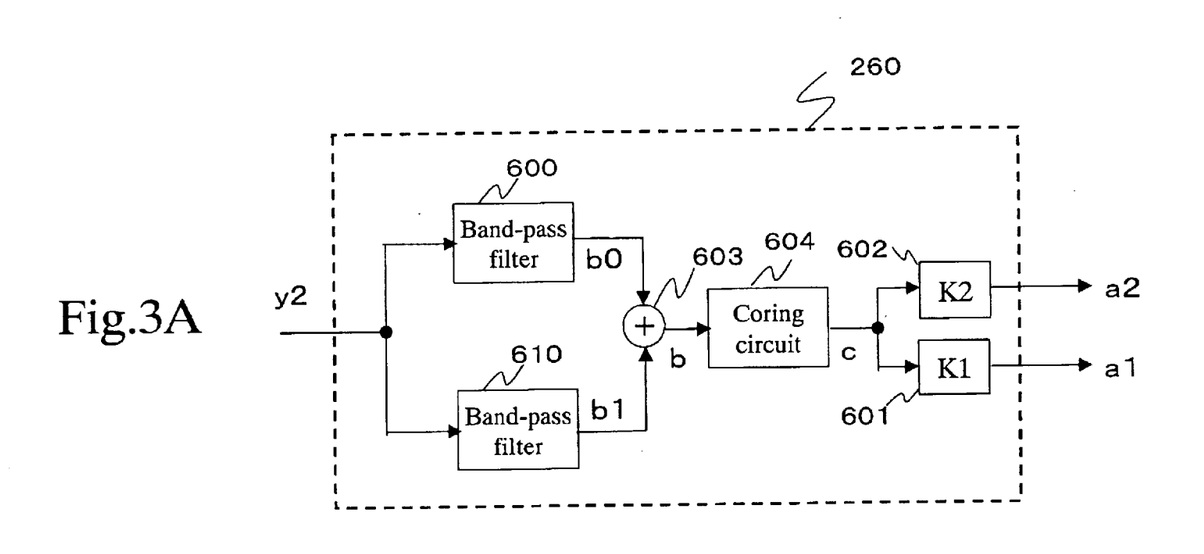
FIG. 3A is a block diagram depicting another structure of a vibration detector in a control unit according to the present invention.

FIG. 3A is a block diagram showing an example of another embodied structure of vibration detector 160 in the head positioning device. Like reference numerals are used to designate like structural elements corresponding to those shown in FIG. 2. The vibration detector is shown by reference numeral 260. This vibration detector 260 differs from the vibration detector 160 illustrated in FIG. 2, in that it further has a plurality of band-pass filters and a coring circuit.

Figure 3B:
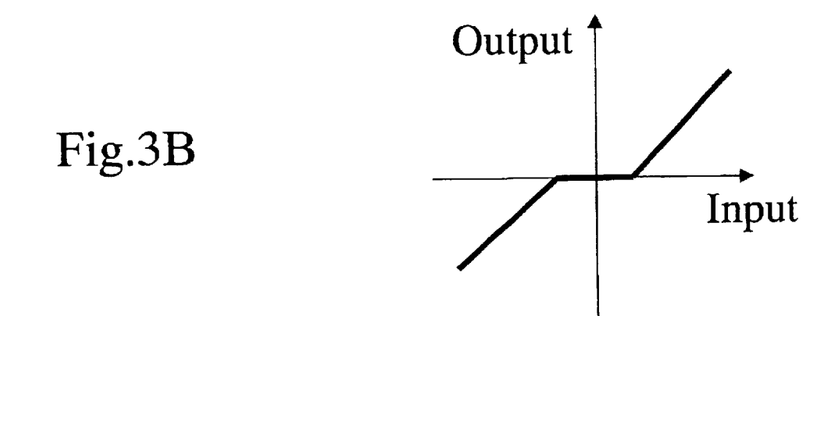
FIG. 3B is a graphic representation showing an example of a nonlinear characteristic of a coring circuit in the vibration detector.

In FIG. 3A, the vibration detector 260 receives as an input the relative displacement signal "y2" from the fine actuator 52. Each of band-pass filters 600 and 610 in the vibration detector 260 receives the relative displacement signal "y2", extracts signal components of a prescribed high frequency contained in the relative displacement signal "y2", and outputs the extracted signal components as extracted vibration signal "b0" and "b1" respectively. The band-pass filter 600 and another band-pass filter 610 are preset for different center frequencies with respect to each other. Therefore, they extract and output respective signal components of different frequencies. Adder 603 adds up the extracted vibration signals "b0" and "b1" from the band-pass filters 600 and 610. The added result referred to as vibration detection signal "b" from the adder 603 is input to coring circuit 604 for nonlinear processing. FIG. 3B is a graphic representation showing an example of a nonlinear characteristic of the coring circuit 604. In FIG. 3B, axis of abscissa shows input level of an input signal to the coring circuit 604, and axis of ordinate shows output level of an output signal from the coring circuit 604. Because of the nonlinear characteristic as shown, the coring circuit 604 removes signal components of minute amplitude contained in the input signal, and it outputs only signal components of comparatively large amplitude. Signal "c" output from the coring circuit 604 is amplified by amplifiers 601 and 602 having their respective gains of predetermined values. The signals thus amplified individually are output as fine motion correction signal "a2" from the amplifier 602 to the fine motion corrector 164 and also as coarse motion correction signal "a1" from the amplifier 601 to the coarse motion corrector 163, in the same manner as in the case of the vibration detector 160 described for FIG. 2.

Having the structure as described above, the vibration detector 260 extracts vibrating components of the fine actuator 52 due to external disturbances, and generates the fine motion correction signal "a2" as well as the coarse motion correction signal "a1" for correction of influence from the disturbances by using the signal containing the extracted vibrating components, in the same way as the vibration detector 160.

Described next is an operation of the vibration detector 260. The vibration detector 260 has two band-pass filters, band-pass filter 600 and another band-pass filter 610. They enable the vibration detector 260 to detect frequency components corresponding to two different kinds of the external disturbances. There are many factors of vibrations and impacts that cause disturbances, and their frequencies are not specifically fixed. The two band-pass filters are provided for this reason, to enable the vibration detector 260 to detect vibrating components of the disturbances by the related factors that affect the positioning control system. In the illustrated embodiment, although two band-pass filters are shown, this is not restrictive and that the vibration detector may be provided with any number of band-pass filters. To this contrary, the vibration detector can be adapted for a wide range of disturbance factors even if it has only one band-pass filter like the vibration detector 160, by widening a frequency band of the band-pass filter. The vibration detector 260 provided with the plurality of band-pass filters thus detects vibrating components of the external disturbances caused by a variety of factors.

Furthermore, the vibration detector 260 has the coring circuit 604. This circuit removes signal components of minute amplitude contained in the detected vibrating components, and outputs only signal components of comparatively large amplitude. That is, in the foregoing embodiment, although the regulating components of the relative displacement signal "y2" have been described as such that they are distributed in the vicinity of direct current in respect to their frequencies, these regulating component also contain high frequency components of minute amplitude, to be more precise. For example, the fine actuator 52 turns to a track-following operation while repeating positive to negative displacement, or vibration, in the transition period when it turns from a seek operation to the following operation. In addition, the fine actuator 52 follows the target track while repeating positive to negative displacement of a minute magnitude even during the following operation. Therefore, the relative displacement signal "y2" contains high frequency components of minute amplitude in the regulating components, as described above during the transition period and the following operation. These vibrations in the regulating components are combined and output with an output signal of the adder 603. Since such vibrations in the regulating components are not the vibrating components produced by the disturbances, they cause an adverse effect in the normal positioning operation with the structure of vibration detector 160. The coring circuit 604 is provided for the purpose of removing the vibrations in the regulating components during the above-said transition and following periods. Since the vibrations in the regulating components are very small in amplitude, they can be removed with the coring circuit 604 having a nonlinear characteristic as shown in FIG. 3B. On the other hand, the coring circuit 604 outputs the vibrating components of the external disturbances caused by vibrations and impacts without removing them, since they constitute a signal of large amplitude. Accordingly, the vibration detector 260 provided with the coring circuit 604 extracts the vibrating components attributable only to the disturbances caused by the vibrations and impacts, more properly.

The signal "c" representing vibrating components, that comprise thus properly separated and extracted vibrating components of disturbances caused by a variety of factors, is amplified to a predetermined gain, and output as fine motion correction signal "a2" to the fine motion corrector 164, and also as coarse motion correction signal "a1" to the coarse motion corrector 163. As a result, the present head positioning device functions to cancel adverse effect of vibrations on the fine actuator 52 and the coarse actuator 51 due to the external vibrations and impacts, thereby repressing degradation of the positioning accuracy by the external disturbances at all the time during the operation.

Although the coring circuit 604 has been illustrated as having the nonlinear characteristic shown in FIG. 3B, other types of characteristics may also provide like effectiveness. In other words, the coring circuit 604 may have, any type of nonlinear characteristics so long as it is capable of removing signal components of minute amplitude, and outputting only signal components of large amplitude. In addition, although the illustrated structure includes the coring circuit 604 disposed after the adder 603, it may be replaced by two coring circuits, which are placed individually after the band-pass filters 600 and 610, and outputs of these coring circuits may be added together, to achieve like effectiveness.

(Second Exemplary Embodiment)

Figure 4:
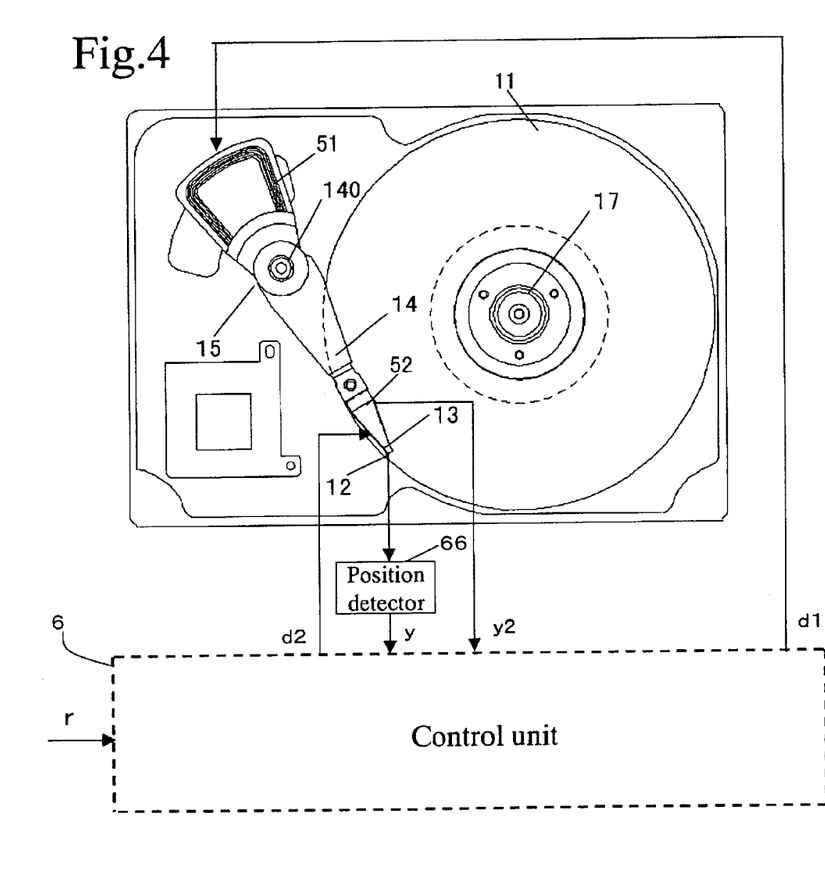
FIG. 4 is a structural diagram of a magnetic disk drive unit of a second exemplary embodiment of the present invention.

FIG. 4 is a structural diagram of a magnetic disk drive unit of a second exemplary embodiment of the present invention. The magnetic disk drive unit of this second exemplary embodiment represents an example in which the head positioning device illustrated in the first exemplary embodiment is employed in the magnetic disk drive.

In FIG. 4, magnetic head 12 (hereinafter referred to as "head"), which reads and writes data to and from magnetic disk 11 (hereinafter referred to as "disk"), a kind of recording media of a discoidal shape rotated by spindle motor 17, is mounted integrally to a tip of head slider 13. The head slider 13 is mounted to a tip end of fine actuator 52, and the fine actuator 52 is connected to one end of head support mechanism 14. The head support mechanism 14 is driven by coarse actuator 51 to rotate about rotary shaft 140 mounted to a main body of the magnetic disk drive, and to position the head 12 in cooperation with function of the fine actuator

52. A combination of the coarse actuator 51, the fine actuator 52 and the head support mechanism 14 is called positioning mechanism 15. As illustrated, the positioning mechanism 15 of this exemplary embodiment has a structure of two-stage actuator having the coarse actuator 51 and the fine actuator 52. The coarse actuator 51 rotates the head support mechanism 14 with a voice-coil motor or the like to move the head 12 on its tip end, and it is used primarily for a large movement such as a seek operation, jumping across a plurality of tracks, and the like. On the other hand, the fine actuator 52 is controlled over a wide band, but within a small movable range, by displacement of a piezo element or the like, to move the head 12 on the tip end, and it is used mainly for a fine positioning of the head 12 with high speed, such as following a track, jumping over a single track, and the like.

The positioning mechanism 15 is driven to carry out the positioning in response to a control signal from control unit 6 comprising a control circuit. The control unit 6 generates the control signal according to relative displacement signal "y2" corresponding to a magnitude of displacement, i.e. a displacement distance, of the fine actuator 52, present position signal "y" generated by position detector 66 using a servo data read by the head 12, target position signal "r" directed to it for an operation of the necessary positioning, and so forth. A driving circuit converts the control signal into driving signals "d1" and "d2" for use to drive the drives coarse actuator 51 and the fine actuator 52, and to servo-control them.

The control unit 16 of FIG. 1 described in the first exemplary embodiment of this invention may be used for the control unit 6, and the vibration detector 160 of FIG. 2 or another vibration detector 260 of FIG. 3A may be used for the above vibration detector. They can thus realize the magnetic disk drive unit capable of repressing degradation of the positioning accuracy resulting from the disturbances at all the time without being restricted to a time period during which the fine actuator is held at a given distance of displacement, such as in the following operation and the like.

In the present invention, although control unit 16 defining the control means for positioning the head 12 has been described as having a configuration adopted to control the two-stage actuator shown in FIG. 1, the control means can be of any other form as long as it performs the positioning control by operating the two-stage actuator cooperatively to move the head 12 to a target position in a manner that an absolute value of the displacement distance of the fine actuator 52 is reduced to the minimum.

Although the configuration described in the present invention is adapted to make correction of the external disturbances with both the fine motion corrector 164 and the coarse motion corrector 163, the correction can also be made only with either one of them.

Moreover, in the present invention, although the described embodiment has the head 12 for writing and reading data, it can be a structure wherein the head slider 13 is provided with two heads, of which one is used for writing and the other for reading, instead of the structure having only one head 12 for both writing and reading data.

In the present invention, although the described embodiment is an example that reads and writes data on one side of the disk 11, it can be a head positioning device and a disk drive unit for reading and writing data on both sides of disk 11, or a head positioning device and a disk drive unit having a plurality of disks for reading and writing data by rotating them altogether.

Furthermore, in the present invention, although what has been described as an example represents a magnetic disk drive unit, this invention is not restricted to it, but the invention can be embodied in other forms such as an optical disk device using an optical head and the like.

As has been illustrated, the head positioning device of the present invention and the disk drive using the same are provided with a vibration detector for detecting vibrations and impacts, and a disturbance corrector for canceling an influence of the vibrations and impacts, both for the purpose of repressing an adverse effect of the vibrations and impacts even when the disk drive receives the vibrations and impacts during positioning operation. The vibration detector has a band-pass filter for extracting only vibrating components caused by the external disturbances that may be contained in a relative displacement signal from a fine actuator. The disturbance corrector uses the extracted vibrating components to correct the influence of the external disturbances. As a result, the head positioning device is not specially required to have an acceleration sensor or the like, but it can use the inherently provided fine actuator. In addition, the vibration detector separates and extracts the vibrating components produced by the external disturbances according to their frequencies from the regulating components for the positioning control, as contained in the relative displacement signal. Therefore, the head positioning device of the present invention is able to detect the vibrating components of the external disturbances without being restricted by time such as within a time period during which the fine actuator is held to a given distance of displacement. According to the present invention, the head positioning device and the disk drive can thus correct the adverse effect of the external disturbances to the positioning control at all the time, so as to repress degradation of the positioning accuracy resulting from the disturbances and to always continue stable operation for the positioning control.

What is claimed is:

1. A head positioning device comprising:

head moving means defining an actuator provided with a coarse actuator and a fine actuator; and control means for positioning control by operating said actuator cooperatively to move a head to a target position in a manner that an absolute value of a displacement distance of said fine actuator is reduced to a minimum, wherein said control means further comprises:

positioning control means for generating a control signal used to control positioning of said coarse actuator and said fine actuator;

vibration detection means for extracting only a high frequency component contained in a signal corresponding to said displacement distance of said fine actuator; and disturbance correction means for combining said high frequency component with said control signal.

2. A head positioning device comprising:

a fine actuator having a head mounted thereto for reading and/or writing data on a recording medium of discoidal shape, said fine actuator for making fine positioning of said head;

a coarse actuator for making rough positioning of said head by moving a head support mechanism provided with said fine actuator; and a control unit for controlling a displacement of said fine actuator and a movement of said head with said coarse actuator, wherein said control unit further comprises:
- a fine motion controller for receiving, as an input of position error signal, a difference between a target position signal for positioning said head into a target position and a present position signal derived from a servo data on said recording medium read by said head, and generating a fine motion control signal to control a magnitude of displacement of said fine actuator according to said position error signal;
- a coarse motion controller for receiving a relative displacement signal corresponding to a displacement distance of said fine actuator, and generating a coarse motion control signal to control a movement of said head by said coarse actuator based on said relative displacement signal;
- a vibration detector for receiving said relative displacement signal, extracting a high frequency component contained in said relative displacement signal, and using said extracted high frequency component as a vibration detection signal to produce and output a fine motion correction signal and a coarse motion correction signal by amplifying said vibration detection signal with a predetermined amplification factor;
- a fine motion corrector for producing a signal by combining together said fine motion control signal and said fine motion correction signal, and outputting said signal as a fine motion composite signal; and
- a coarse motion corrector for producing another signal by combining together said coarse motion control signal and said coarse motion correction signal, and outputting said another signal as a coarse motion composite signal,
- wherein said control unit drives said fine actuator according to said fine motion composite signal, and said coarse actuator according to said coarse motion composite signal.

3. The head positioning device according to claim 2, wherein said fine actuator comprises a piezoelectric element.

4. The head positioning device according to claim 3, wherein the piezo-electric element constituting the fine actuator is formed of a piezo-electric film.

5. The head positioning device according to claim 4, wherein the piezo-electric film is mounted on a suspension provided to part of said head support mechanism.

6. The head positioning device according to claim 2, wherein said vibration detector comprises a band-pass filter for extracting a signal component of high frequency within a predetermined bandwidth, for outputting said signal component extracted by said band-pass filter as a vibration detection signal.

7. The head positioning device according to claim 6, wherein said fine actuator comprises a piezo-electric element.

8. The head positioning device according to claim 7, wherein the piezo-electric element constituting the fine actuator is formed of a piezo-electric film.

9. The head positioning device according to claim 8, wherein the piezo-electric film is mounted on a suspension provided to part of said head support mechanism.

10. The head positioning device according to claim 6, wherein said vibration detector further comprises a coring circuit having a nonlinear characteristic for removing a signal component of minute amplitude, and said coring circuit receives said signal component of high frequency extracted by said band-pass filter and outputting as a vibration detection signal a signal processed nonlinearly by use of said nonlinear characteristic.

11. The head positioning device according to claim 10, wherein said fine actuator comprises a piezo-electric element.

12. The head positioning device according to claim 11, wherein the piezo-electric element constituting the fine actuator is formed of a piezo-electric film.

13. The head positioning device according to claim 12, wherein the piezo-electric film is mounted on a suspension provided to part of said head support mechanism.

14. A disk drive unit provided with a head positioning device, said head positioning device comprising:
- head moving means defining an actuator provided with a coarse actuator and a fine actuator; and
- control means for positioning control by operating said actuator cooperatively to move a head to a target position in a manner that an absolute value of a displacement distance of said fine actuator is reduced to a minimum,
- wherein said control means further comprises:
- positioning control means for generating a control signal used to control positioning of said coarse actuator and said fine actuator;
- vibration detection means for extracting only a high frequency component contained in a signal corresponding to said displacement distance of said fine actuator; and
- disturbance correction means for combining said high frequency component with said control signal.

15. A disk drive unit provided with a head positioning device, said head positioning device comprising:
- head moving means defining an actuator provided with a coarse actuator and a fine actuator; and
- control means for positioning control by operating said actuator cooperatively to move a head to a target position in a manner that an absolute value of a displacement distance of said fine actuator is reduced to a minimum,
- wherein said control means further comprises:
- positioning control means for generating a control signal used to control positioning of said coarse actuator and said fine actuator;
- vibration detection means for extracting only a high frequency component contained in a signal corresponding to said displacement distance of said fine actuator; and
- disturbance correction means for combining said high frequency component with said control signal.

* * * * *